June 18, 1963   H. M. KOWALKE, JR., ETAL   3,094,233
DEVICE FOR TRANSPORTING ROTARY HOES Filed July 15, 1960   2 Sheets-Sheet 2

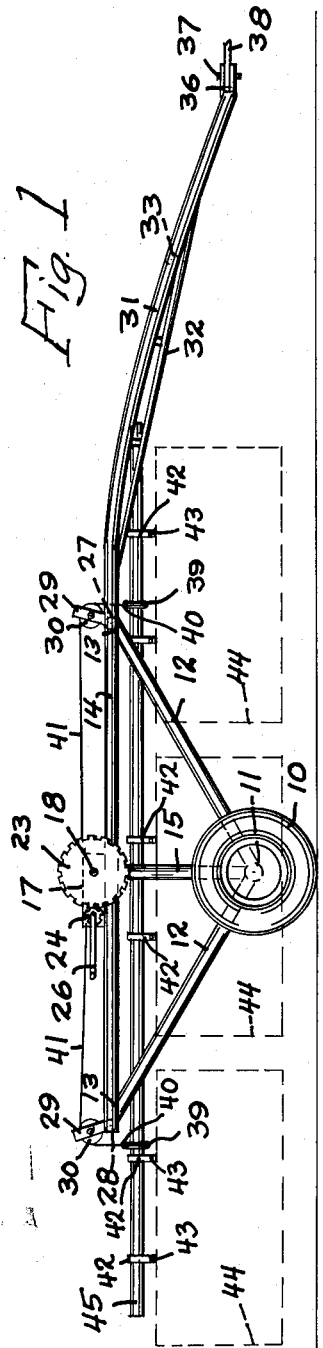
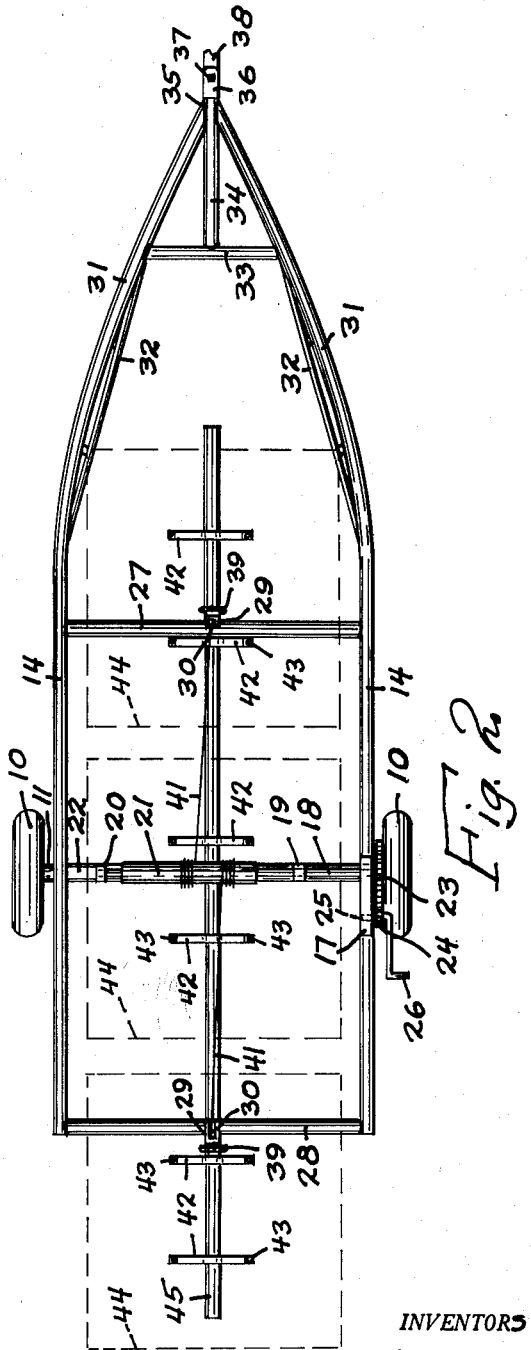

INVENTORS
Herman M. Kowalke Jr.
BY Donald P. MacKay

Sam J. Slotsky
ATTORNEY

United States Patent Office 3,094,233
Patented June 18, 1963

3,094,233
DEVICE FOR TRANSPORTING ROTARY HOES
Herman M. Kowalke, Jr., Rte. 1, Le Mars, Iowa, and
Donald P. MacKay, Rte. 1, Ramsen, Iowa
Filed July 15, 1960, Ser. No. 43,073
1 Claim. (Cl. 214—394)

Our invention relates to a device for transporting hoes or other similar equipment.

An object of our invention is to provide a device which is especially suitable for transporting devices of an articulated type.

A further object of our invention is to provide a transporting device which can be readily and quickly attached to the equipment to be transported, and thence conveniently raised to transporting position.

A further object of our invention is to provide an arrangement which can be accommodated to a variety of different types of equipment.

Figure 3:
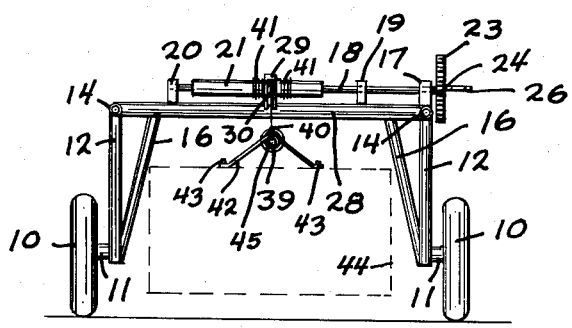
Figure 4:
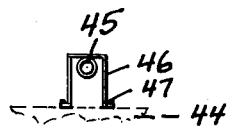

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

FIGURE 1 is a side elevation of our device,
FIGURE 2 is a plan view of FIGURE 1,
FIGURE 3 is a rear view of FIGURE 1, and
FIGURE 4 is a slight modification.

Our invention relates to a transporting framework or unit which can be used to transport devices along highways for instance, and wherein such devices could not normally be rolled over the highway in that they would have sharp points and the like which would injure such highways.

Our invention further contemplates the provision of an arrangement or device in which the lifting effort is applied to a single unitary lengthened pipe only, thereby rendering the device quick and convenient to install, and also rendering the device capable of transporting structures having several separate parts.

We have used the character 10 to designate the side wheels of our arrangement, the wheels being suitably journalled on the stub shafts 11, and extending from the shafts 11 are the braces 12 which are attached as at 13 to the laterally spaced tubular members 14, the character 15 indicating further vertical braces or supports attached to the members 14, the character 16 indicating further braces (see FIGURE 3).

The character 17 indicates an elongated rectangular block in which is journalled a transverse shaft 18 which is journalled in the bearings 19 and 20, the shaft 18 passing through a cylindrical winch member 21. The bearings 19 and 20 are attached to a suitable transverse tubular brace 22, which is secured to the side members 14.

Attached to one end of the shaft 18 is a large gear 23 which meshes with a smaller gear 24, which smaller gear is secured to a shaft 25 which is journalled in the block member 17, and extending from the shaft 25 is the handle member 26.

The characters 27 and 28 indicate further transverse tubular braces which are attached to the side members 14, and firmly secured to the members 27 and 28 are the substantially U-shaped members 29 in which are journalled the pulleys 30.

The members 14 extend into the integral bowed portions 31 which are braced by means of the bracing rods 32 etc., the character 33 indicating a transverse further bracing tube which is secured to the further tubular member 34 which is attached as at 35 to the juncture of the portions 31, the character 36 indicating a hitch unit attached to this juncture as shown, the character 37 indicating a hitching pin which can be attached to a tractor draw-bar 38 or the like for drawing the arrangement.

The character 39 indicates a pair of circular rings which are attached at 40 to the cables 41, which cables 41 pass over the pulleys 30 and are reeled upon the reel portion 21.

The character 42 designates straps, which straps are secured as at 43 to the units which are to be carried, the character 44 indicating by dotted lines rotary hoes, it being understood, however, that our invention will pertain to any other type of structure to be transported over highways and the like. The character 45 indicates a lengthened tube.

For transporting the units 44, the structure is passed over the units which will be resting upon the ground, and the winch 21 is operated by means of the handle 26 and gears 23 and 24 until the rings 39 are in alignment with the openings provided by the straps 42, whereupon the pipe 45 can be placed through all of these members, and the winch is reversed so that the cables 41 will draw upwardly on the rings 39 so that the members 44 will then be raised off of the ground, whereupon the unit can then be towed to transport the hoes or other equipment.

It will be obvious that any other type of equipment whether articulated or not could also be transported by this arrangement, and FIGURE 4 discloses a modification wherein U-shaped units 46 attached as at 47 to the transporting units can be employed, and it should also be understood that any other type of arrangement can be employed as long as it will receive the pipe 45.

Also in many cases in those structures having openings therein in the proper places, the pipe 45 can be used for the same purpose.

It will thus be obvious that the centrally positioned pipe 45 together with the rings 39 etc. provides a convenient and quick method for attaching the implements and then raising the same to the necessary height for transporting purposes.

It will now be seen that we have provided the advantages mentioned in the objects of our invention with further advantages being apparent.

Some changes may be made in the construction and arrangement of the parts of our invention without departing from the real spirit and purpose of our invention, and it is our intention to cover by our claim any modified forms of structure or use of mechanical equivalents which may be reasonably included within their scope.

We claim as our invention:

A device for transporting implements comprising a framework including a pair of transversely spaced horizontal beams, a hitch portion attached to said beams, said beams including downwardly inclined forward portions attached to said hitch portion, a substantially centrally positioned lengthened tube adapted to be supported from said framework, a transversely positioned winch attached to said framework, cables attached to said winch, rings attached to the outer ends of said cables adapted to receive said tube whereby said tube can be longitudinally adjusted with respect to said rings, means for attaching an implement load to said tube including looped elements attached to said implement load for receiving said tube, rotation of said winch adapted to raise said implement load.

References Cited in the file of this patent
UNITED STATES PATENTS
2,551,174    Shipman et al. _____ May 1, 1951
FOREIGN PATENTS
470,114    Great Britain _____ Aug. 10, 1937